(12) United States Patent
Okayama

(10) Patent No.: US 6,553,162 B1
(45) Date of Patent: Apr. 22, 2003

(54) OPTICAL MULTIPLEXER-DEMULTIPLEXER WITH MUTUALLY INTERSECTING SUB-GRATINGS

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 262 days.

(21) Appl. No.: 09/712,156

(22) Filed: Nov. 15, 2000

(30) Foreign Application Priority Data

Nov. 16, 1999 (JP) .......................................... 11-324942

(51) Int. Cl.[7] ................................................ G02B 6/34
(52) U.S. Cl. .......................... 385/37; 359/130; 359/634
(58) Field of Search ............................. 385/8, 10, 132, 385/14–16, 30–32, 129–131, 42, 45, 92, 33, 24, 37; 359/321, 322, 237, 245, 127, 634, 130, 619, 124

(56) References Cited

U.S. PATENT DOCUMENTS

| | | | | |
|---|---|---|---|---|
| 5,481,516 A | * | 1/1996 | Kim | 369/44.12 |
| 6,052,213 A | * | 4/2000 | Burt et al. | 359/237 |
| 6,134,369 A | * | 10/2000 | Kurosawa | 385/132 |
| 6,310,991 B1 | * | 10/2001 | Koops et al. | 385/14 |
| 6,317,554 B1 | * | 11/2001 | Kosaka et al. | 385/132 |

OTHER PUBLICATIONS

K. Yukimatsu, "Optical Switching and Optical Internnections," Kyoritsu Shuppan, 1998, pp. 136–139.
H. Nishihara et al., Optical Integrated Circuits, Ohm., 1993, pp. 288–291.
J. M/ Verdiell et al., "WDM Receiver with Integrated Optical Preamplifier, Aspheric Lens and Grating Filter," Electronics Letters, vol. 29, No. 11, May 27, 1993, pp 992 and993.

* cited by examiner

Primary Examiner—Frank G. Font
Assistant Examiner—Michael P. Mooney
(74) Attorney, Agent, or Firm—Wenderoth, Lind & Ponack, L.L.P.

(57) ABSTRACT

An optical multiplexer-demultiplexer has a diffraction grating formed from a plurality of mutually intersecting sub-gratings. Each sub-grating has a grating vector. The diffraction grating as a whole has a combined high-order grating vector equal to a sum of integer multiples of the grating vectors of the sub-gratings. The diffraction grating reflects incident optical signals by Bragg reflection. The difference between the propagation vector of an incident optical signal and the propagation vector of the reflected optical signal is equal to the combined high-order grating vector. A small change in wavelength of the incident optical signal can therefore produce a large change in propagation direction of the reflected optical signal.

18 Claims, 7 Drawing Sheets

OPTICAL MULTIPLEXER-DEMULTIPLEXER WITH MUTUALLY INTERSECTING SUB-GRATINGS

BACKGROUND OF THE INVENTION

The present invention relates to an optical multiplexer-demultiplexer, more particularly to an optical multiplexer-demultiplexer incorporating a diffraction grating.

Optical multiplexer-demultiplexers are used in lightwave communication systems to combine optical signals of different wavelengths into a single optical signal, and to separate a wavelength-multiplexed optical signal into its component signals. Conventional optical multiplexer-demultiplexers are of the multiple interference type, employing the phenomenon of constructive and destructive interference among light waves having equal wavelength and various phase relationships. An important parameter of these devices is their wavelength resolution, which depends on their ability to change the propagation direction of an optical signal according to its wavelength.

One example of the prior art is the arrayed waveguide grating (AWG) described by, for example, K. Yukimatsu on pages 137–138 of Hikari Suicchingu to Hikari Intakonekus-hon (Optical Switching and Optical Interconnections). This device, referred to below as the first conventional device, comprises a closely-spaced array of parallel waveguides of different lengths, passing through two slab waveguides located near the input and output ends of the array. Optical signals interfere in the slab waveguides. The wavelength resolution of this device is expressed by the following equation (1)

$$d\theta = -(\Delta l/s) \times (d\lambda/\lambda) \tag{1}$$

in which $\Delta l$ is the difference in length between adjacent waveguides in the array, s is the spacing between adjacent waveguides at the points at which they are connected to the slab waveguides, and $d\theta$ is the angular difference in propagation direction within the slab waveguide of an optical signal of wavelength $\lambda$ and an optical signal of wavelength $\lambda+d\lambda$. More precisely, $\theta$ is the angle between a line joining the entry and exit points of an optical signal and a line normal to the two ends of the slab waveguide, and $d\theta$ is the change in this angle caused by a change of $d\lambda$ in wavelength.

A desirable goal is a change in propagation direction of at least two-tenths of a radian ($d\theta \geq 0.2$ rad) when the wavelength varies by about one percent ($d\lambda/\lambda \approx 0.01$). Structural constraints, however, set a lower limit on the array spacing s and an upper limit on the length difference $\Delta l$; typically, the array spacing is about fifteen micrometers (s $\approx 15$ μm) and the length difference is at most about forty or fifty micrometers ($\Delta l \approx 45$ μm). Accordingly, the change in propagation direction is only about three hundredths of a radian ($d\theta \approx 0.03$ rad) instead of the desired two-tenths of a radian or more (when $d\lambda/\lambda \approx 0.01$).

Another example of the prior art is the device described by H. Nishihara et al. in Hikari Shuseki Kairo (Optical Integrated Circuits). In this device, referred to below as the second conventional device, a diffraction grating is formed ;across one end facet of a waveguide, and an array of optical fibers is connected to the opposite end facet. Optical signals are reflected at different angles by the diffraction grating, according to their wavelengths. The wavelength resolution is given by the following equation (2), in which $\Lambda$ is the grating pitch, $\theta$ is the angle of propagation of an optical signal with respect to a line normal to the grating surface, and the other symbols have the meanings given above.

$$d\theta = \pm 1/(\Lambda/\lambda \times \cos\theta) \times (d\lambda/\lambda) \tag{2}$$

The wavelength resolution of this device can be improved by reducing the grating pitch $\Lambda$, but there are limits beyond which that is not feasible. Typically, the grating pitch $\Lambda$ is about one-third the wavelength $\lambda$, making the maximum change in propagation direction that can be achieved approximately the same as in the first conventional device ($d\theta \approx 0.03$ rad when $d\lambda/\lambda \approx 0.01$).

Still another example of the prior art is a waveguide within which photonic crystals, such as silica particles, are disposed in a regular array. This device, referred to below as the third conventional device, can generate relatively large changes in propagation direction (e.g., $d\theta \approx 1$ rad when $d\lambda/\lambda \approx 0.01$), but it is difficult to manufacture, because the photonic crystals must be very small and the spacing between them must be equal to or less than the wavelength of the optical signal.

Yet another example of the prior art is the device described by J. M. Verdiell et al. in Electronics Letters, Vol. 29, No. 11, pp. 992–993. This device, referred to below as the fourth conventional device, employs a slightly tilted Bragg grating, disposed at one end of a slab waveguide, to reflect light of a particular wavelength to a detector located at the opposite end of the waveguide, thereby selecting one channel from a wavelength-multiplexed optical signal. For operation as a multiplexer or demultiplexer, a separate Bragg grating is employed for each wavelength, the gratings differing in their grating pitch and tilt angle.

The fourth conventional device is also difficult to manufacture, because a separate grating is required for each wavelength.

SUMMARY OF THE INVENTION

An object of the present invention is to increase the wavelength resolution of an optical multiplexer-demultiplexer.

A more specific object of the invention is to provide an optical multiplexer-demultiplexer with a structure that is easy to manufacture, in which a one-percent change in signal wavelength produces a change of at least two tenths of a radian in signal propagation direction.

The invented optical multiplexer-demultiplexer has a diffraction grating in which optical signals are reflected by Bragg reflection. The diffraction grating comprises a plurality of mutually intersecting sub-gratings, each having a plurality of perturbing elements, the perturbing elements of each sub-grating intersecting the perturbing elements of the other sub-gratings. Each sub-grating has a grating vector. The diffraction grating as a whole has a combined high-order grating vector equal to a sum of integer multiples of the grating vectors of the sub-gratings. The difference between the propagation vector of an incident optical signal and the propagation vector of the reflected optical signal is equal to the combined high-order grating vector.

DETAILED DESCRIPTION OF THE INVENTION

Figure 1:
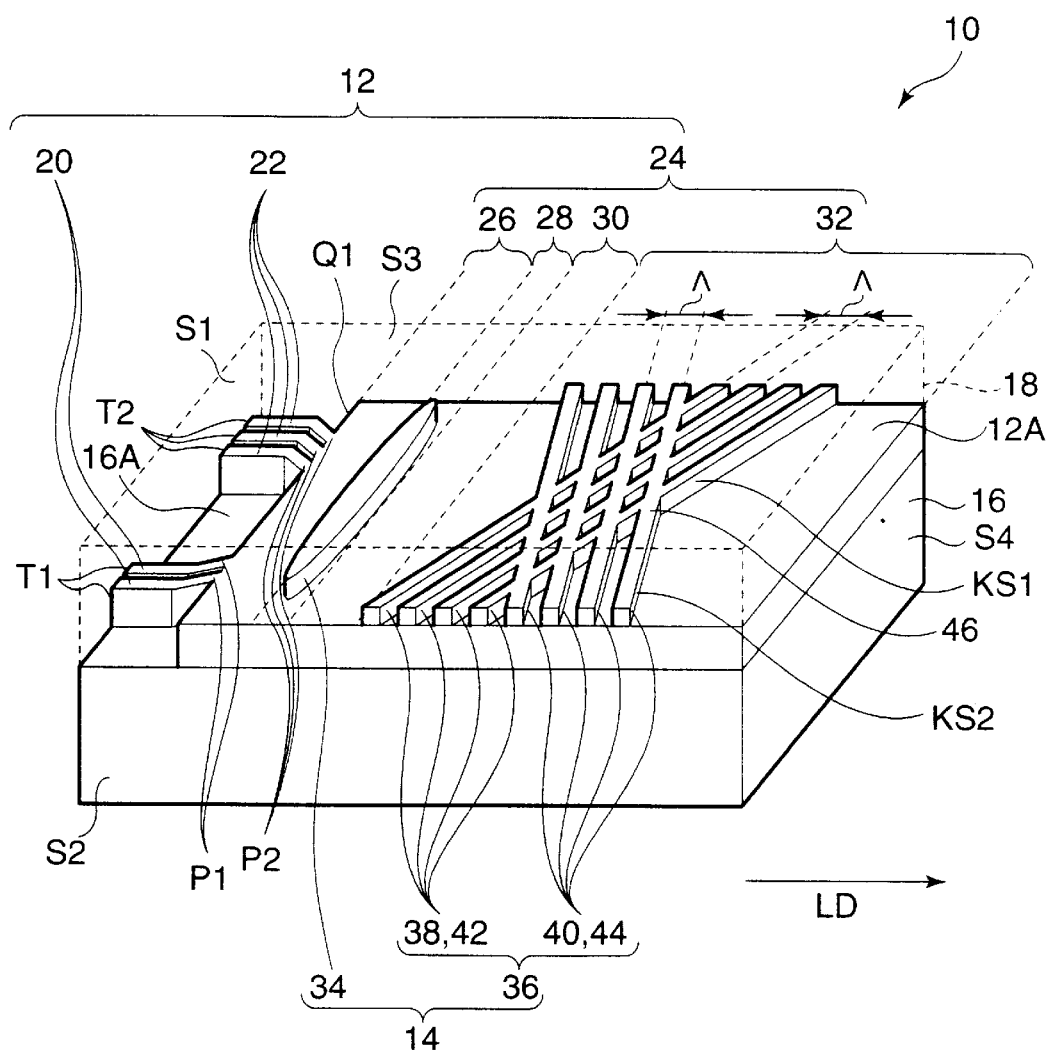
FIG. 1 is a perspective view of an optical multiplexer-demultiplexer illustrating a first embodiment of the invention.

Embodiments of the invention will be described with reference to the attached drawings, in which like parts are indicated by like reference characters.

The terms plane wave and propagation vector, as used herein, are related by the following equation (3), in which V is the value of the electric field of a plane wave at a point given by a position vector r, A is the amplitude of the plane wave at the origin position (r=0), exp is the exponential function, $\omega$ is the angular frequency of the plane wave, t represents time, $\beta$ is the propagation vector of the plane wave, $\beta \cdot r$ is the dot product of $\beta$ and r, and j is the square root of minus one.

$$V = A \times \exp(j \times (\omega t - \beta \cdot r)) \quad (3)$$

As a first embodiment of the invention, FIG. 1 illustrates a first optical multiplexer-demultiplexer 10 that uses Bragg reflection to demultiplex a wavelength-multiplexed optical signal, or to multiplex optical signals having mutually differing wavelengths.

The first optical multiplexer-demultiplexer 10 has a waveguide 12 through which optical signals propagate. A perturbing system 14, formed on the upper surface 12A of the waveguide 12, perturbs light traveling in the waveguide 12 so as to change the direction of propagation of the light by a wavelength-dependent amount. The waveguide 12 and perturbing system 14 are sandwiched between a substrate 16 and a cladding layer 18 that confine light to the waveguide 12. In this embodiment, the same material is used for both the substrate 16 and the cladding layer 18. The cladding layer 18 is indicated in dotted lines in FIG. 1 so as to emphasize the structure of the waveguide 12 and perturbing system 14. The overall shape of the first optical multiplexer-demultiplexer 10 is that of a rectilinear solid with sides S1, S2, S3, and S4, S1 being opposite to S4, and S2 opposite to S3. The direction parallel to sides S2 and S3 is the longitudinal direction LD of the device.

The first optical multiplexer-demultiplexer 10 is fabricated as follows. First the substrate 16 is formed from a material possessing an electro-optical effect, such as an organic material, a ferroelectric material, glass, indium phosphide (InP), or lithium niobate (LiNbO$_3$). A core layer is grown as a film on the upper surface 16A of the substrate 16 by a process such as chemical vapor deposition (CVD) or epitaxial growth. The core layer is, for example, a layer of non-doped indium gallium arsenide phosphide (InGaAsP), which is suitable if the substrate 16 comprises InP. Next, a resist pattern having the desired shape of the waveguide 12 is formed on the flat surface of the core layer by, for example, photolithography, and the core layer is patterned by, for example, dry etching to create the waveguide 12.

A perturbing layer, such as a layer of a material having a higher refractive index than the waveguide 12, is now deposited on the surface of the waveguide 12 and the exposed parts of the upper surface 16A of the substrate 16 by, for example, CVD or epitaxial growth. Next, a resist pattern having the desired shape of the perturbing system 14 is formed on part of the surface of the waveguide 12 by, for example, photolithography, and the perturbing layer is patterned by, for example, dry etching to create the perturbing system 14. Finally, the cladding layer 18 is deposited, by CVD or epitaxial growth, for example, on the entire surface of the device, including the surface of the perturbing system 14 and the exposed parts of the upper surfaces of the waveguide 12 and substrate 16. The cladding layer 18 is grown to a uniform thickness.

As shown in FIG. 1, the waveguide 12 comprises three areas. One area includes one or more first input-output waveguides 20 (two are shown). Another area includes at least two second input-output waveguides 22 (three are shown). The third area is an interference waveguide 24, in which the perturbing system 14 is formed.

The first input-output waveguides 20 are bent single-mode waveguides that meet the first side S1 of the first optical multiplexer-demultiplexer 10 in respective first input-output terminals T1, to which optical fibers, for example, can be attached for input or output of optical signals. The first input-output waveguides 20 extend away from these first input-output terminals T1 for a certain distance from the first side S1 toward the fourth side S4, paralleling the second side S2. The first input-output waveguides 20 then bend slightly toward the third side S3, and meet an edge of the interference waveguide 24 at an angle. This edge of the interference waveguide 24 will be referred to as the interfering edge Q1, and the points at which the first input-output waveguides 20 meet it will be referred to as first ports P1. At these first ports P1, optical signals may enter the interference waveguide 24 from the first input-output waveguides 20, or reflected optical signals may exit from the interference waveguide 24 into the first input-output waveguides 20.

The second input-output waveguides 22 are bent single-mode waveguides that meet the first side S1 of the first optical multiplexer-demultiplexer 10 in respective second input-output terminals T2, to which optical fibers, for example, can be connected for the input or output of optical signals. The second input-output waveguides 22 extend away from these second input-output terminals T2 for a certain distance from the first side S1 toward the fourth side, paralleling the third side S3, then bend slightly toward the second side S2 and meet the interfering edge Q1 of the interference waveguide 24 at an angle, at respective second ports P2. At these second ports P2, optical signals may enter the interference waveguide 24 from the second input-output waveguides 22, or reflected optical signals may exit from the interference waveguide 24 into the second input-output waveguides 22.

The purpose of the first and second input-output waveguides 20, 22 is to ensure that the direction of propagation of the optical signals entering the interference waveguide 24 is proper for Bragg reflection. If this condition can be met by connecting optical fibers, for example, directly to the first and second ports P1 and P2, then the first and second input-output waveguides 20, 22 can be omitted, and the first and second ports P1 and P2 can also function as the first and second input-output terminals T1 and T2. Optical signals entering the first optical. multiplexer-demultiplexer 10 at the first terminals T1 leave the first optical multiplexer-demultiplexer 10 at the second terminals T2. Similarly, optical signals entering the first optical multiplexer-demultiplexer 10 at the second terminals T2 leave the first optical multiplexer-demultiplexer 10 at the first terminals T1. In the same way, optical signals entering the interference waveguide 24 through the first ports P1 exit through the second ports P2, and optical signals entering the interference waveguide 24 through the second ports P2 exit through the first ports P1.

A wavelength-multiplexed optical signal entering the first optical multiplexer-demultiplexer 10 at a first terminal T1, for example, is demultiplexed in the interference waveguide 24, and the demultiplexed optical signals exit through two or more of the second terminals T2. Due to the reversible nature of light propagation, a plurality of optical signals with different wavelengths may enter the first optical multiplexer-demultiplexer 10 at different second terminals T2 and exit as a single multiplexed optical signal through a single first terminal T1. It is also possible to have a wavelength-multiplexed optical signal enter through a second terminal T2, in which case the demultiplexed optical signals exit through two or more first terminals T1.

The interference waveguide 24 extends from the second side S2 to the third side S3, and from the interfering edge Q1 to the fourth side S4. The interference waveguide 24 comprises four areas: a diffracted-wave area 26 in which optical signals propagate as diffracted waves; a wavefront conversion area 28 in which the diffracted waves are converted to plane waves, or vice versa; a plane-wave area 30 in which the optical signals propagate as plane waves; and a Bragg reflection area 32 in which the optical signals are reflected by Bragg reflection. The perturbing system 14 comprises a perturbing lens element 34, which is formed on the surface of the wavefront conversion area 28, and a diffraction grating 36, which is formed on the surface of the Bragg reflection area 32.

The perturbing lens element 34 has the shape of a double-convex lens with one convex side facing the interfering edge Q1 and side S1, while the other convex side faces the Bragg reflection area 32 and side S4. Since the refractive index of the perturbing lens element 34 is higher than the refractive index of the interference waveguide 24, the perturbing lens element 34 functions as a converging lens, converting diffracted waves to plane waves and vice versa.

The diffraction grating 36 functions as a reflector, reflecting light signals incident from the direction of the first side S1 back toward the first side S1, at angles at which the Bragg condition for reflection is satisfied. The diffraction grating 36 comprises a plurality of sub-gratings. In the present embodiment, there are a first sub-grating 38 and a second sub-grating 40. The first sub-grating 38 comprises a plurality of perturbing elements 42 with straight sides KS1 rising from the surface 12A of the waveguide 12 in the interference waveguide 24. The perturbing elements 42 are disposed at a constant grating spacing or pitch Λ. As shown in the drawing, Λ is the distance between the centerlines of two adjacent perturbing elements 42. The second sub-grating 40 comprises a similar plurality of perturbing elements 44 with straight sides KS2, disposed at the same constant grating pitch Λ. Because of the straight sides of the perturbing elements 42 and perturbing elements 44, plane waves incident on the diffraction grating 36 are reflected as plane waves by Bragg reflection.

The two sub-gratings 38, 40 are mutually intersecting. That is, each perturbing element 42 in the first sub-grating 38 intersects one or more of the perturbing elements 44 in the second sub-grating 40. The Bragg condition for a diffraction grating of this type can be written in the following form (4), $$(m \times K_1) + (n \times K_2) = \beta_2 - \beta_1 \tag{4}$$

where $\beta_1$ denotes the propagation vector of an optical signal incident on the Bragg reflection area 32, $\beta_2$ denotes the propagation vector of the reflected optical signal, $K_1$ denotes the grating vector of the first sub-grating 38, $K_2$ denotes the grating vector of the second sub-grating 40, and m and n are integers. Grating vector $K_1$ has magnitude $2\pi/\Lambda$ and is directed perpendicular to the sides KS1 of the perturbing elements 42 in the first sub-grating 38. Similarly, grating vector $K_2$ has magnitude $2\pi/\Lambda$ and is directed perpendicular to the sides KS2 of the perturbing elements 44 in the second sub-grating 40.

It is convenient to define the grating sum vector K as follows.

$$K = (m \times K_1) + (n \times K_2) \tag{5}$$

In areas in which the perturbing elements 42, 44 do not intersect, one of the integers m, n is equal to zero. In the intersecting areas 46 of the perturbing elements 42, 44, the values of both m and n are non-zero. The grating sum vector in the intersecting areas 46 will be referred to below as the combined high-order grating vector. The Bragg condition for reflection by the intersecting areas 46 is thus the condition that the combined high-order grating vector be equal to the difference between the propagation vector of the incident optical signal and the propagation vector of the reflected optical signal.

Bragg reflection of the optical signals can also occur if the grating sum vector is equal to the difference between the incident and reflected propagation vectors in areas other than the areas of intersection 46; that is, in areas where m or n is equal to zero.

The distribution function C(r) of the diffraction grating 36 can be defined by the following Fourier expansion (6), using the grating vectors $K_1$ and $K_2$, r being a position vector.

$$C(r) = \sum_{m=1}^{\infty} \sum_{n=1}^{\infty} A_{m,n}(r) \times \exp\{-j \times (mK_1 + nK_2) \cdot r\} \tag{6}$$

where $Am,n(r)$ is the difference between the refractive index of the perturbing elements 42, 44 and the refractive index of the interference waveguide 24 at position r. The position vector r can be expressed as (x, y, z) in Cartesian coordinates, where the xy plane coincides with the upper surface 12A of the waveguide 12, so that the z-direction is perpendicular to the upper surface 12A. Since the distribution function C(r) is constant in the z-direction, the equation above can be rewritten in the form (7) below.

$$C(x, y) = \sum_{m=1}^{\infty} \sum_{n=1}^{\infty} A_{m,n}(x, y) \times \\ \exp\{-j \times [(mK_{1x} + nK_{2x}) \times x + (mK_{1y} + nK_{2y}) \times y]\} \tag{7}$$

where $K_{1x}$ and $K_{1y}$ are the x-component and y-component of grating vector $K_1$, and $K_{2x}$ and $K_{2y}$ are the x-component and y-component of grating vector $K_2$. If perturbing elements as specified by this distribution function C(x, y) are formed on the upper surface 12A in the Bragg reflection area 32, then optical signals propagating through the Bragg reflection area 32 will be affected by the perturbing elements in such a way that Bragg reflection will occur.

Figure 2:
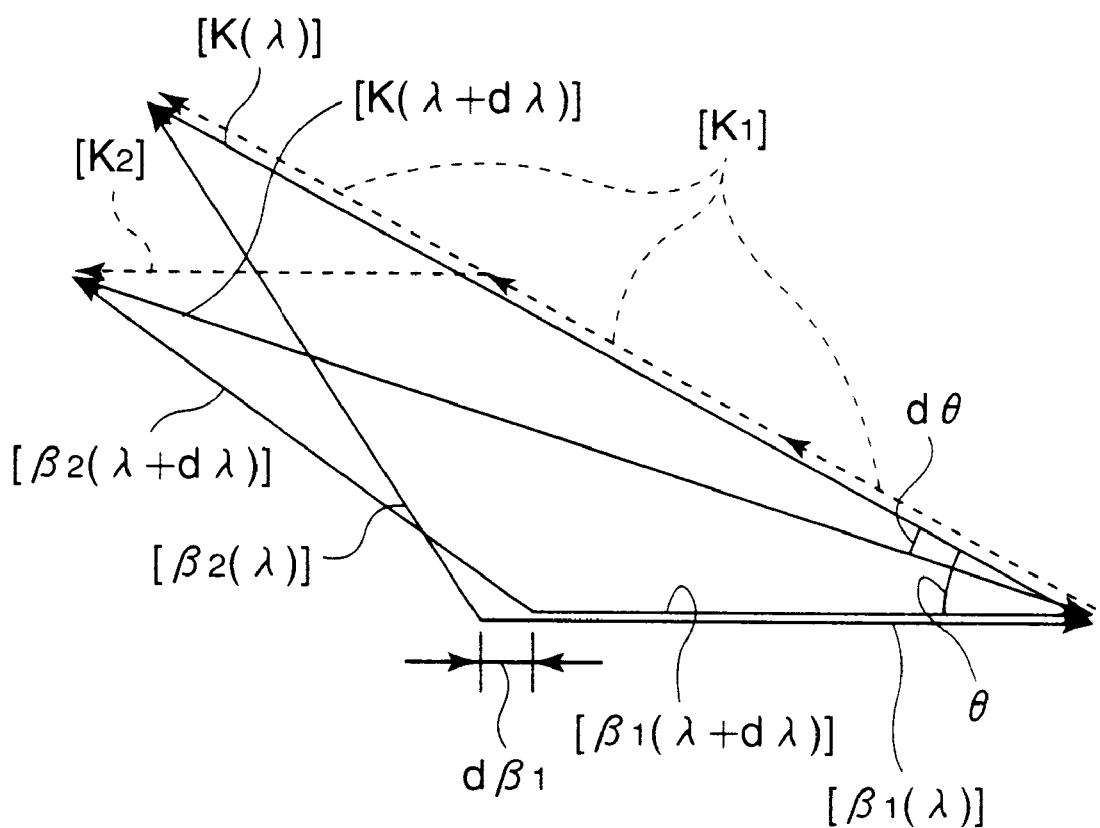
FIG. 2 is a propagation vector diagram illustrating the operation of the first embodiment.

The wavelength resolution of the first optical multiplexer-demultiplexer 10 will now be derived with reference to FIG. 2, which shows two superimposed wave propagation diagrams, one relating to light of a wavelength λ satisfying the Bragg condition for (m, n)=(3, 0), the other relating to light of a wavelength λ+dλ satisfying the Bragg condition for (m, n)=(2, 1). In this example, dλ>0.

A scalar expression of the Bragg condition for wavelength λ will be derived first. Substitution of the integer values (m, n)=(3, 0) into the equations above gives the following condition.

$$K(\lambda)=3 \times K_1=\beta_2(\lambda) \tag{8}$$

Since n=0, this grating sum vector K(λ) is not a combined high-order grating vector. In other words, an optical signal of wavelength λ is reflected only by the perturbing elements 42 of the first sub-grating 38.

If the magnitude of the incident propagation vector $\beta_1(\lambda)$ is assumed to be equal to the magnitude of the reflected propagation vector $\beta_2(\lambda)$, then the triangle formed by the incident propagation vector $\beta_1(\lambda)$ the reflected propagation vector $\beta_2(\lambda)$, and the grating sum vector K(λ) is an isosceles triangle. The grating sum vector K(λ) thus forms the same angle θ with the incident propagation vector $\beta_1(\lambda)$ and the reflected propagation vector $\beta_2(\lambda)$, and the Bragg condition can be rewritten in the following scalar form (9).

$$|\beta(\lambda)| \times \cos\theta = |K(\lambda)|/2 \tag{9}$$

Next, the scalar expression of the Bragg condition for light of wavelength λ+dλ will be derived. Substitution of the integer values (m, n)=(2, 1) into the equations above gives the following condition (10).

$$K(\lambda+d\lambda)=2 \times K_1+1 \times K_2=\beta_2(\lambda+d\lambda)-\beta_1(\lambda+d\lambda) \tag{10}$$

Since m≈0 and n≈0, this grating sum vector K(λ+dλ) is a combined high-order grating vector, and Bragg reflection occurs with respect to both sets of perturbing elements 42, 44.

If the incident propagation vector $\beta_1(\lambda+d\lambda)$ and the reflected propagation vector $\beta_2(\lambda+d\lambda)$ are assumed to have equal magnitude, so that the triangle formed by the incident propagation vector $P_1(\lambda+d\lambda)$, the reflected propagation vector $\beta_2(\lambda+d\lambda)$, and the combined high-order grating vector K(λ+dλ) is an isosceles triangle, then the grating sum vector K(λ+dλ) forms the same angle θ+dθ with the incident propagation vector $\beta_1(\lambda+d\lambda)$ and the reflected propagation vector $\beta_2(\lambda+d\lambda)$. As stated above, dθ>0.

The difference between the magnitude of incident propagation vector $\beta_1(\lambda+d\lambda)$ and incident propagation vector $\beta_1(\lambda)$ will be denoted $d\beta_1$. In this example, $d\beta_1<0$.

Similarly, the difference between the magnitude of combined high-order grating vector K(λ+dλ) and the grating sum vector K(λ) will be denoted dK. In this example, dK<0.

The Bragg condition for reflection of the optical signal of wavelength λ+dλ can be rewritten in the following scalar form (11).

$$(|\beta_1(\lambda)|+d\beta_1) \times \cos(\theta+d\theta)=(|K(\lambda)|+dK)/2 \tag{11}$$

When $d\beta_1$ approaches zero and dθ approaches 0°, so that $d\beta_1 \times d\theta$ is approximately equal to 0°, this equation can be further rewritten as follows (12).

$$(|\beta_1(\lambda)| \times \cos(\theta)) - (|\beta_1(\lambda)| \times \sin(\theta) \times d\theta) + (d\beta_1 \times \cos(\theta)) = \tag{12}$$
$$(|K(\lambda)|+dK)/2$$

The wavelength resolution can now be obtained as follows. From the difference between equations (9) and (12), the following equation (13) is obtained.

$$d\beta_1/|\beta_1(\lambda)|=d\theta \times \tan\theta + dK/(2 \times |\beta_1(\lambda)|\cos(\theta)) \tag{13}$$

Substitution of the following equation (14)

$$d\beta_1/|\beta_1(\lambda)|=d\lambda/\lambda \tag{14}$$

into the above equation (13) gives the equation (15) below, which expresses the reciprocal of the wavelength resolution.

$$d\lambda/\lambda=(d\theta \times \tan\theta)+dK/(2 \times |\beta_1(\lambda)| \times \cos(\theta)) \tag{15}$$

This equation (15) will be used to discuss the effect of the diffraction grating 36.

When there is substantially no difference dK between the magnitudes of the two combined high-order grating vectors K(λ+dλ) and K(λ), that is, as dK approaches zero, $$d\lambda/\lambda=d\theta \times \tan\theta \tag{16}$$

This equation (16) indicates that if the angle θ is small enough, the desired combination of a large change dθ in the propagation directions with a small change dλ/λ can be achieved. The quantity dλ/λ will be referred to below as the reciprocal wavelength resolution.

An angular change dθ of 0.2 radian can be achieved for a reciprocal wavelength resolution dλ/λ approximately equal to 0.01 if θ is substantially equal to 3°, implying that the incident optical signal is nearly normal to the grating sides KS1 and KS2. That is, the optical signals propagate in substantially the longitudinal direction LD. For a given wavelength spacing, the distance between mutually adjacent first ports P1, or between mutually adjacent second ports P2, can therefore be greater than the corresponding distance in the first and second conventional devices. Alternatively, for a fixed port spacing, the wavelengths can be more closely spaced in the multiplexed signal.

When the difference dK between the magnitudes of the two combined high-order grating vectors K(λ+dλ) and K(λ) is too big to be ignored, as the angle θ approaches zero, so that the incident optical signal is substantially normal to the grating sides KS1 and KS2, the following equation (17) is obtained.

$$d\lambda/\lambda=(d\theta \times \theta)+dK/(2 \times |\beta_1(\lambda)|) \tag{17}$$

The value of the second term on the right side of this equation becomes larger than the value of the first term on the right side, but the angular change (dθ) in propagation direction can be set to an arbitrary value with respect to dλ. That is, the first optical multiplexer-demultiplexer 10 can be designed with the reciprocal wavelength resolution dλ/λ and the angular change dθ mutually independent. The spacing between mutually adjacent first ports P1, or between mutually adjacent second ports P2, can again be made greater than in the corresponding spacing in the first and second conventional devices, or alternatively, the wavelength spacing can be reduced.

In the first embodiment, the first and second sub-gratings 38, 40 have the same grating pitch Λ. This simplifies the design of the two sub-gratings 38, 40, and thus simplifies the fabrication of the first optical multiplexer-demultiplexer 10. The value of Λ should be greater than one-half the wavelength of the optical signal the propagates within the first optical multiplexer-demultiplexer 10, to enable the combined high-order grating vector K to be used for multiplexing and demultiplexing in the diffraction grating 36. This condition (Λ>λ/2) does not, of course, exclude the use of a grating sum vector K in which the integer m or n is zero.

Figure 3:
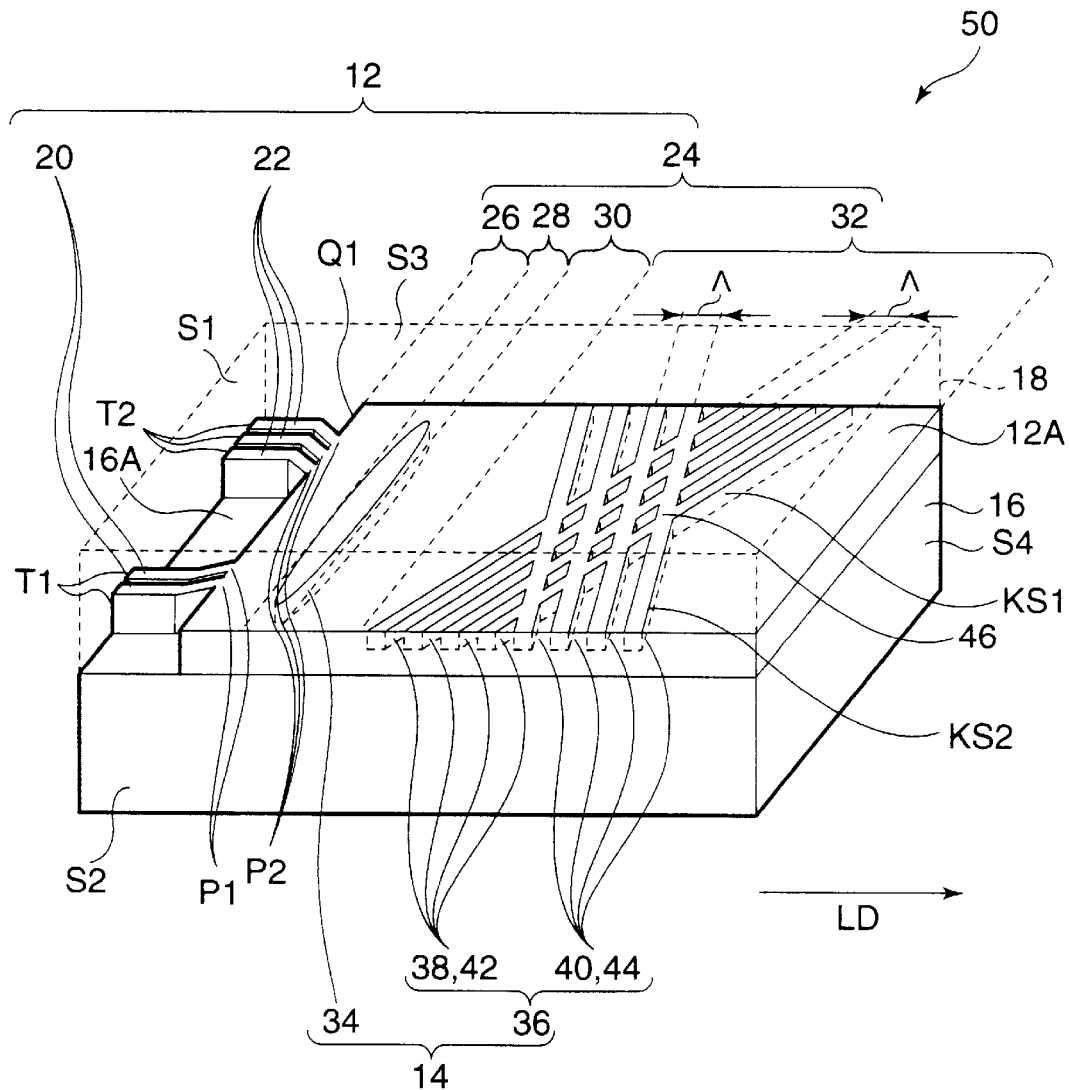
FIG. 3 is a perspective view of an optical multiplexer-demultiplexer illustrating a second embodiment of the invention.

Next, a second embodiment will be described, with reference to a second optical multiplexer-demultiplexer 50 shown in FIG. 3. In the second optical multiplexer-demultiplexer 50, the perturbing system 14, comprising the perturbing lens element 34 and diffraction grating 36, is embedded in the interference waveguide 24.

The second optical multiplexer-demultiplexer 50 is manufactured as follows. First, a core layer is deposited on the surface 16A of the substrate 16 and patterned as described in the first embodiment to form the waveguide 12. Next, an impurity such as germanium (Ge) that increases the refractive index of the waveguide 12 is selectively introduced into the waveguide 12 from the upper surface 12A by, for example, solid-phase diffusion or ion implantation, forming a perturbing lens element 34 within the wavefront conversion area 28, and a diffraction grating 36 within the Bragg reflection area 32. As in the first embodiment, the perturbing lens element 34 is given the form of a double convex lens, and the diffraction grating 36 comprises two mutually intersecting sub-gratings 38, 40. The impurity is not introduced into the diffracted-wave area 26 or plane-wave area 30. Finally, the cladding layer 18 is formed by CVD or epitaxial growth, for example, on the upper surface 12A of the waveguide 12 and the exposed surface 16A of the substrate 16, as described in the first embodiment.

The effect of the perturbing system 14 is the same as in the first embodiment, so a detailed description will be omitted.

Figure 4:
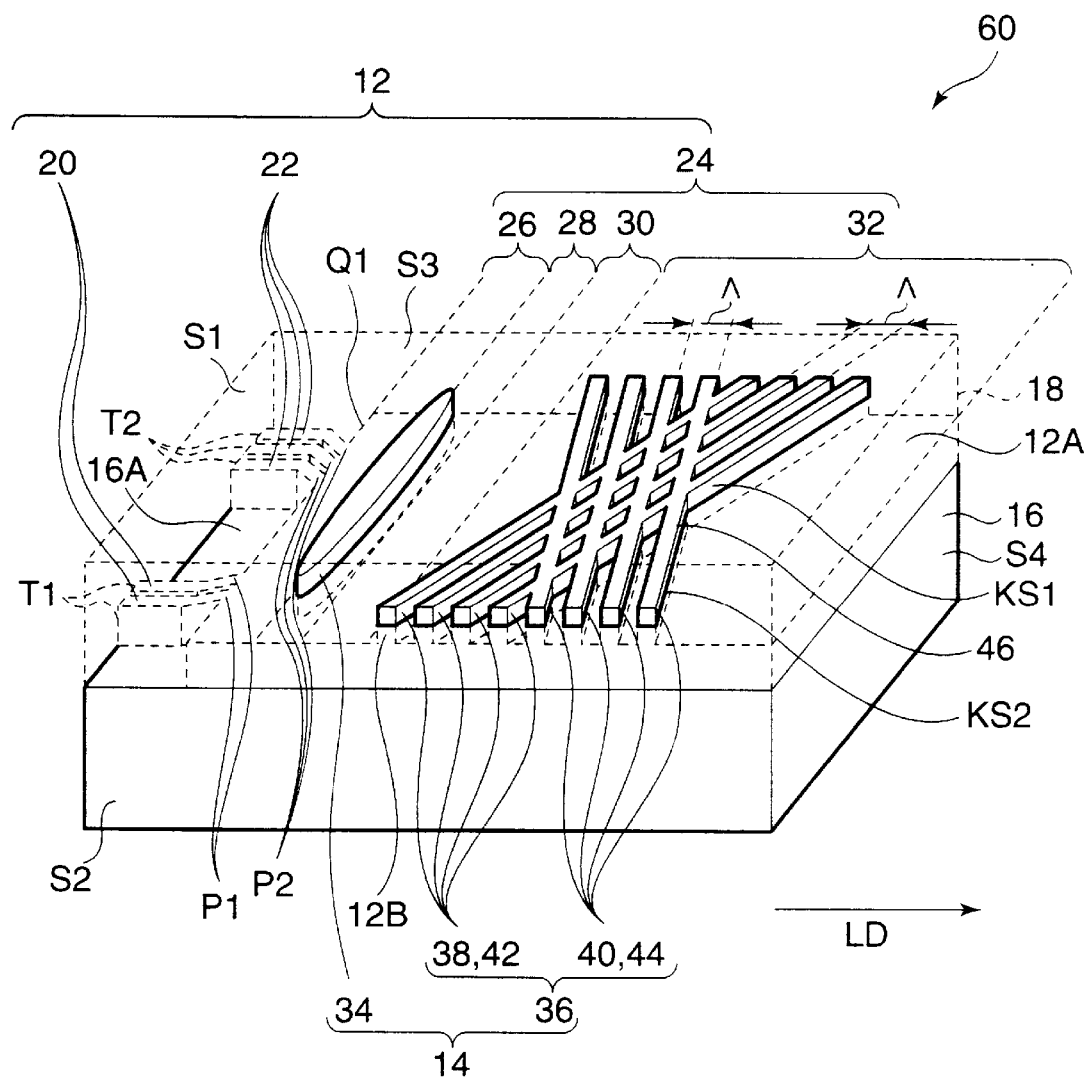
FIG. 4 is a perspective view of an optical multiplexer-demultiplexer illustrating a third embodiment of the invention.

Next, a third embodiment will be described, with reference to the third optical multiplexer-demultiplexer 60 shown in FIG. 4. In the third optical multiplexer-demultiplexer 60, the perturbing system 14 is formed on ridges in the waveguide 12.

The third optical multiplexer-demultiplexer 60 can be manufactured as follows. After the waveguide 12 has been formed as described in the first embodiment, the upper surface 12A of the waveguide 12 is patterned to form ridges 12B in the interference waveguide 24, these ridges 12B having the intended shape of the perturbing lens element 34 and diffraction grating 36 as seen from the upper surface 12A. Then a new core layer, having a higher refractive index than the waveguide 12, is deposited on the waveguide 12 and patterned by photolithography and etching to form the perturbing lens element 34 and diffraction grating 36 on the ridges 12B in the interference waveguide 24. Finally, the cladding layer 18 is formed as described in the first embodiment.

The effect of the perturbing system 14 is substantially the same in the third embodiment as in the first embodiment, so a detailed description will be omitted. The diffraction grating 36 can be formed with grooves instead of ridges. The fabrication process is similar.

Figure 5:
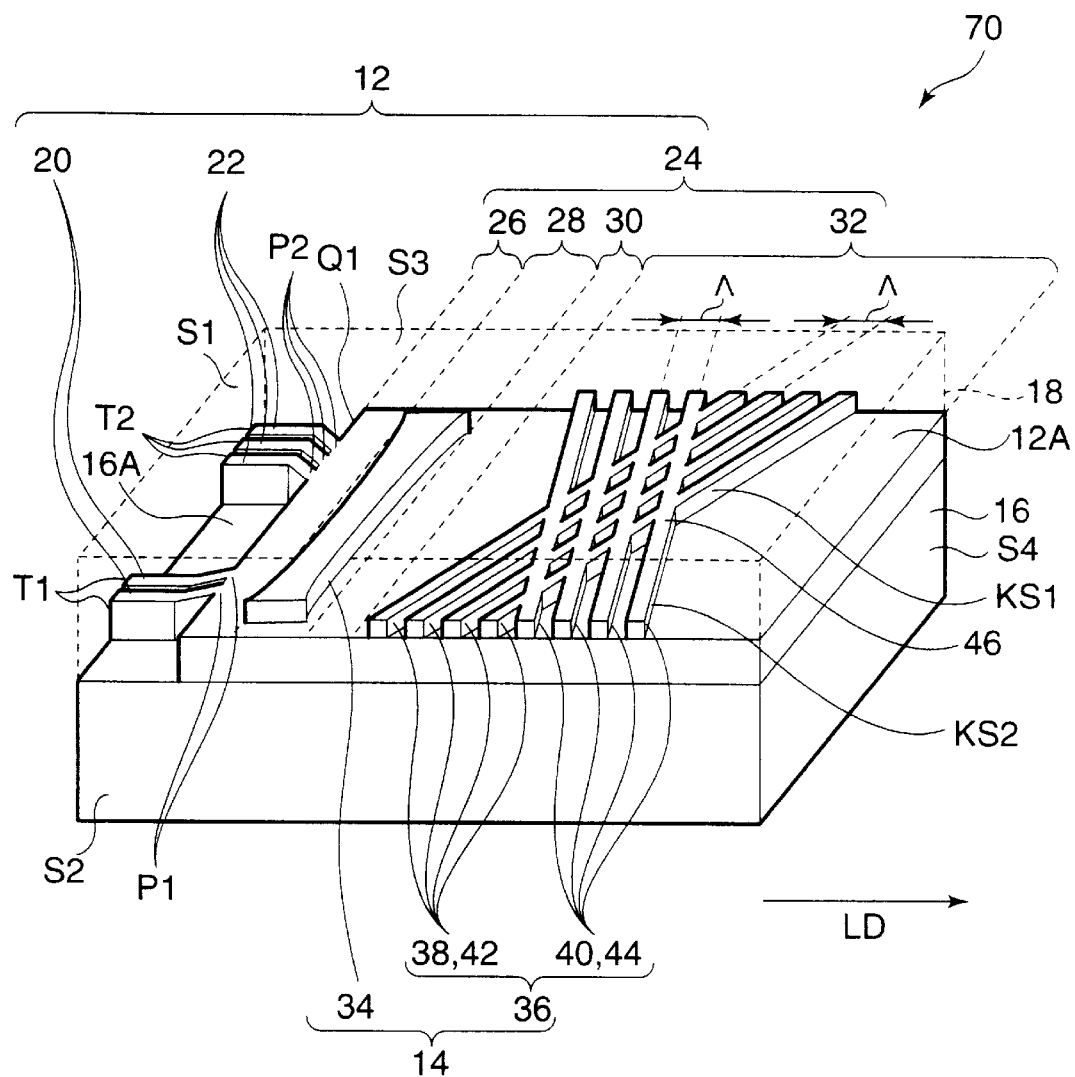
FIG. 5 is a perspective view of an optical multiplexer-demultiplexer illustrating a fourth embodiment of the invention.

Next, a fourth embodiment will be described, with reference to the fourth optical multiplexer-demultiplexer 70 shown in FIG. 5. The fourth optical multiplexer-demultiplexer 70 differs from the first optical multiplexer-demultiplexer 10 in regard to the perturbing lens element 34.

In the fourth optical multiplexer-demultiplexer 70, the perturbing lens element 34 has a double-concave shape. One concave side of the perturbing lens element 34 faces the ports P1, P2, while the other concave side faces the Bragg reflection area 32. The Bragg reflection area 32, as in the first embodiment, is formed of a material having a higher refractive index than that of the waveguide 12, but the perturbing lens element 34 is formed of a material having a lower refractive index than that of the waveguide 12.

The perturbing lens element 34 in the fourth optical multiplexer-demultiplexer 70 performs the same function as the perturbing lens element 34 in the first optical multiplexer-demultiplexer 10. A detailed description will be omitted.

Figure 6:
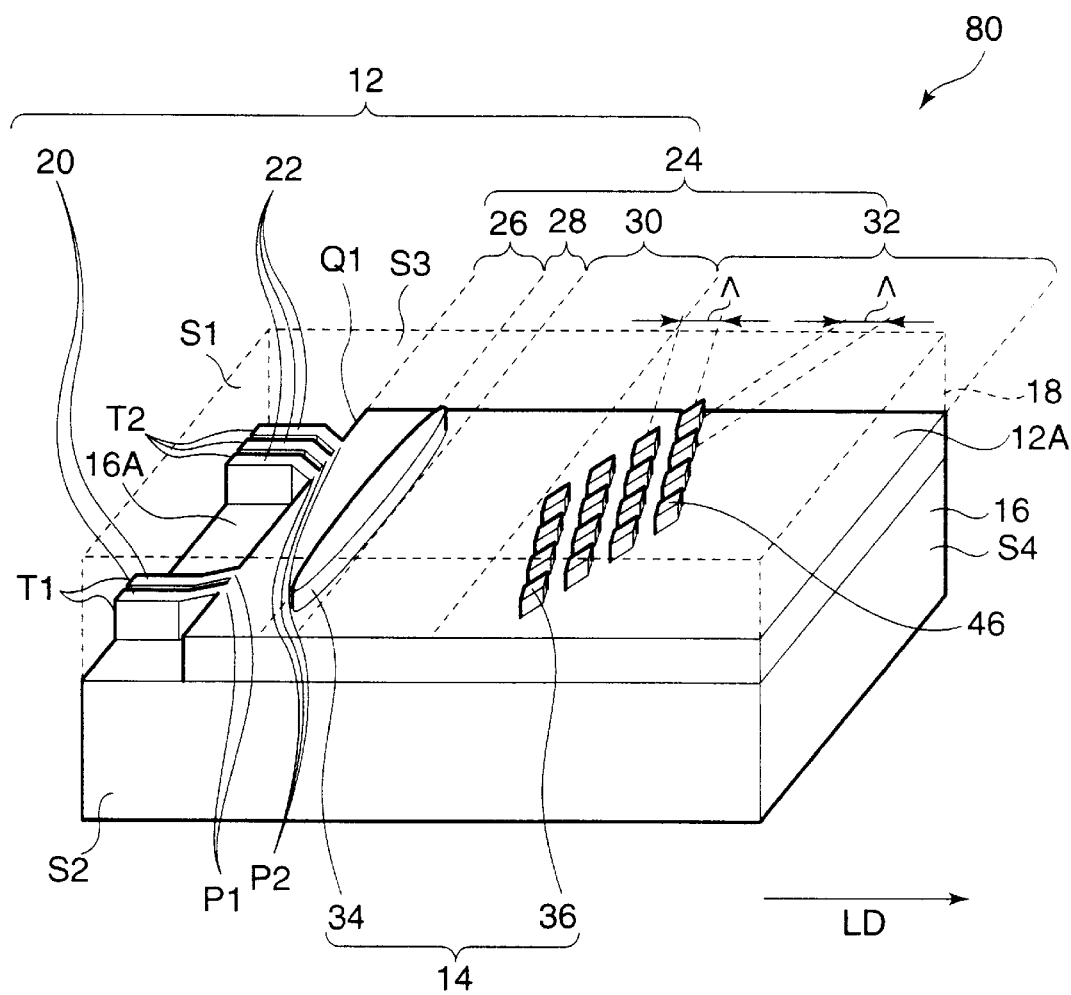
FIG. 6 is a perspective view of an optical multiplexer-demultiplexer illustrating a fifth embodiment of the invention.

Next, a fifth embodiment will be described, with reference to the fifth optical multiplexer-demultiplexer 80 shown in FIG. 6. The fifth optical multiplexer-demultiplexer 80 differs from the first optical multiplexer-demultiplexer 10 in regard to the diffraction grating 36.

The diffraction grating 36 in the fifth optical multiplexer-demultiplexer 80 comprises the intersecting parts 46 of the first sub-grating 38 and second sub-grating 40. The non-intersecting parts of the first sub-grating 38 and second sub-grating 40 are removed during the formation of the perturbing system 14. The diffraction grating 36 thus comprises a diamond-shaped pattern of diamond-shaped intersecting parts 46, as shown in the drawing.

In the fifth optical multiplexer-demultiplexer 80, Bragg reflection takes place only according to the combined high-order grating vector K. (That is, the optical signal is not reflected by use values of the grating sum vector K in which the integer m or n is zero.)

The fifth optical multiplexer-demultiplexer 80 operates in substantially the same way as the first optical multiplexer-demultiplexer 10, so a detailed description will be omitted.

Figure 7:
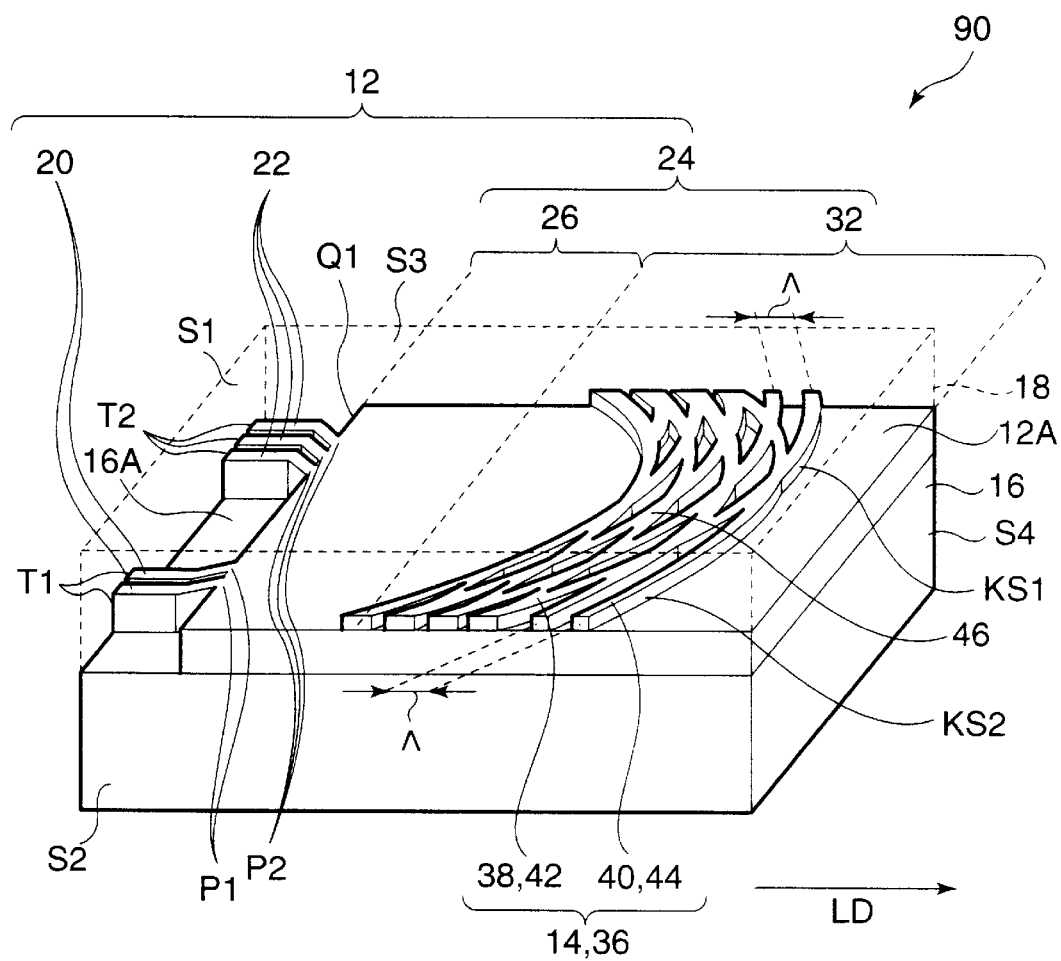
FIG. 7 is a perspective view of an optical multiplexer-demultiplexer illustrating a sixth embodiment of the invention.

Next, a sixth embodiment will be described, with reference to the sixth optical multiplexer-demultiplexer 90 shown in FIG. 7. The sixth optical multiplexer-demultiplexer 90 differs from the first optical multiplexer-demultiplexer 10 in regard to the perturbing system 14.

In the sixth optical multiplexer-demultiplexer 90, there is no perturbing lens element. Accordingly, there is no wavefront conversion area 28 or plane-wave area 30 in the waveguide 12; the diffracted-wave area 26 extends to the Bragg reflection area 32. Optical signals propagate as diffracted waves over the full distance between the ports P1, P2 and the Bragg reflection area 32. The perturbing elements 42, 44 in the diffraction grating 36, however, have curved sides KS1, KS2, the curvature being concave toward the ports P1, P2. This curvature focuses the diffracted waves, so that optical signals entering through one of the first ports P1 are focused back toward the second ports P2, and optical signal entering through one of the second ports P2 are focused back toward the first ports P1.

The sixth optical multiplexer-demultiplexer 90 thus operates in substantially the same way as the first optical multiplexer-demultiplexer 10. A detailed description will be omitted.

All of the embodiments described above enable the angular change dθ to be increased to a desired value, such as 0.2 radian when dλ/λ is substantially equal to 0.01, that increases the wavelength resolution of the device. The device therefore becomes easier to manufacture.

The invention is not limited to the embodiments described above. Possible variations include, for example, the following.

The first input-output waveguides 20 and second input-output waveguides 22 may be multimode waveguides instead of single-mode waveguides.

The diffraction grating 36 may comprise three or more mutually intersecting sub-gratings, instead of just two. The combined high-order grating vector is then a sum of three or more grating vectors multiplied by respective non-zero integers. The combined high-order grating vector must still match the difference between the propagation vector of the incident optical signal and the propagation vector of the reflected optical signal.

The two or more sub-gratings constituting the diffraction grating do not necessarily have to have the same grating pitch Λ.

Various combinations of the above embodiments are possible.

Those skilled in the art will recognize that further variations are possible within the scope claimed below.

What is claimed is:

1. An optical multiplexer-demultiplexer having a diffraction grating by which optical signals of different wavelengths are reflected with different angles of reflection by Bragg reflection, the diffraction grating comprising:
a plurality of mutually intersecting sub-gratings, each having a plurality of perturbing elements, the perturbing elements of each one of the sub-gratings intersecting the perturbing elements of the other ones of the sub-gratings, the sub-gratings having respective grating vectors, the diffraction grating having a combined high-order grating vector equal to a sum of integer multiples of the grating vectors of the sub-gratings, and the diffraction grating being structured such that an incident optical signal having a first propagation vector is reflected by the diffraction grating to yield a reflected optical signal having a second propagation vector, with the second propagation vector and the first propagation vector having a difference equal to the combined high-order grating vector.

2. The optical multiplexer-demultiplexer of claim 1, wherein each one of said sub-gratings has a grating pitch greater than one half wavelength of said optical signals.

3. The optical multiplexer-demultiplexer of claim 1, wherein all of said sub-gratings have equal grating pitch.

4. The optical multiplexer-demultiplexer of claim 1, wherein the optical multiplexer-demultiplexer has a first side (S1), said optical signals approach said diffraction grating from said first side, and said diffraction grating reflects said optical signals back toward said first side.

5. The optical multiplexer-demultiplexer of claim 4, further comprising an interference waveguide having at least one first port, at least two second ports, and a Bragg reflection area in which said Bragg reflection takes place, said optical signals entering and leaving the interference waveguide through said first port and said second ports, the interference waveguide guiding said optical signals between said first port and said Bragg reflection area, and between said second ports and said Bragg reflection area.

6. The optical multiplexer-demultiplexer of claim 5, wherein said interference waveguide has a flat surface, said perturbing elements are disposed on said flat surface, and said perturbing elements have a higher refractive index than the interference waveguide.

7. The optical multiplexer-demultiplexer of claim 5, wherein said interference waveguide has a surface with ridges, said perturbing elements are disposed on said ridges, and said perturbing elements have a higher refractive index than the interference waveguide.

8. The optical multiplexer-demultiplexer of claim 5, wherein said perturbing elements are disposed within the interference waveguide and have a higher refractive index than parts of the interference waveguide other than said perturbing elements.

9. The optical multiplexer-demultiplexer of claim 5, wherein said perturbing elements are confined to the mutually intersecting parts of said sub-gratings.

10. The optical multiplexer-demultiplexer of claim 5, wherein said optical signals enter the interference waveguide at said first port and exit the interference waveguide at said second ports.

11. The optical multiplexer-demultiplexer of claim 5, wherein said optical signals enter the interference waveguide at said second ports and exit the interference waveguide at said first port.

12. The optical multiplexer-demultiplexer of claim 5, wherein the perturbing elements in said sub-gratings have curved sides, the optical signals entering the interference waveguide propagating as diffracted waves to the diffraction grating and being reflected and focused by the diffraction grating to converge on individual ports among said first port and said second ports.

13. The optical multiplexer-demultiplexer of claim 5, wherein the perturbing elements in said sub-gratings have straight sides, the interference waveguide has a diffracted-wave area, a wavefront conversion area, and a plane-wave area, and the optical signals entering the interference waveguide first propagate as diffracted waves in said diffracted-wave area, further comprising:
a perturbing lens element for converting said diffracted waves to plane waves in said wavefront conversion area, said plane waves propagating through said plane-wave area to said Bragg reflection area, being reflected as plane waves back from said Bragg reflection area through said plane-wave area to the wavefront conversion area, and being focused in said wavefront conversion area by the perturbing lens element to converge on individual ports among said first port and said second ports.

14. The optical multiplexer-demultiplexer of claim 13, wherein said wavefront conversion area has a flat surface and said perturbing lens element is disposed on said flat surface.

15. The optical multiplexer-demultiplexer of claim 13, wherein said wavefront conversion area has a surface with a ridge and said perturbing lens element is disposed on said ridge.

16. The optical multiplexer-demultiplexer of claim 13, wherein said perturbing lens element is disposed within said wavefront conversion area.

17. The optical multiplexer-demultiplexer of claim 13, wherein said perturbing lens element has a double convex shape and has a higher refractive index than parts of said wavefront conversion area other than said perturbing lens element.

18. The optical multiplexer-demultiplexer of claim 13, wherein said perturbing lens element has a double concave shape and has a lower refractive index than parts of said wavefront conversion area other than said perturbing lens element.

* * * * *